United States Patent [19]

Wepner et al.

[11] 4,238,718
[45] Dec. 9, 1980

[54] PROCESS AND EQUIPMENT FOR THE PRODUCTION OF SEMI-FINISHED SECTIONS OF ACCURATE WEIGHT OR VOLUME FOR COLD WORKING OR HOT FORMING

[75] Inventors: Joachim Wepner; Jochen Zühlke, both of Gevelsberg, Fed. Rep. of Germany

[73] Assignee: Rolf Peddinghaus, Ennepetal, Fed. Rep. of Germany

[21] Appl. No.: 773,210

[22] Filed: Mar. 1, 1977

[30] Foreign Application Priority Data

Mar. 2, 1976 [DE] Fed. Rep. of Germany ....... 2608551

[51] Int. Cl.³ .............................................. G05G 5/00
[52] U.S. Cl. .................................. 318/626; 318/646; 83/77; 83/212; 83/268; 83/467 R; 269/91; 269/132; 269/315
[58] Field of Search ................... 318/626, 646; 83/73, 83/77, 212, 268, 467 R, 468; 269/315, 91, 130, 132

[56] References Cited

U.S. PATENT DOCUMENTS

| 3,039,344 | 6/1962 | Hercik | 83/212 |
|---|---|---|---|
| 3,078,088 | 2/1963 | Einsiedler | 269/91 |
| 3,163,065 | 12/1964 | Kolodgy et al. | 83/212 |
| 3,175,438 | 3/1965 | Johnson | 83/77 |
| 3,348,441 | 10/1967 | Toney et al. | 83/212 |
| 3,718,061 | 2/1973 | Wilkin | 83/268 |
| 3,910,142 | 10/1975 | Jureit et al. | 83/268 |
| 4,033,571 | 7/1977 | Wepner | 269/315 |

FOREIGN PATENT DOCUMENTS

| 2259950 | 8/1973 | Fed. Rep. of Germany | 318/646 |
|---|---|---|---|
| 2315944 | 11/1973 | Fed. Rep. of Germany | 318/646 |
| 1306091 | 2/1973 | United Kingdom. | |

Primary Examiner—Gene Z. Rubinson
Assistant Examiner—Eugene S. Indyk
Attorney, Agent, or Firm—Dressler, Goldsmith, Shore, Sutker & Milnamow, Ltd.

[57] ABSTRACT

A process and apparatus for producing sections of accurate weight or volume which includes the providing of a computer which receives various signals including the length, weight and density of a sheared off section and in response to such conditions varies the position of a length stop to insure that sections of accurate weight and volume are continuously obtained. The length stop mechanism is regulated by controlling the movement of a plurality of clamping devices which operate in conjunction with the axial movement of the material to be severed. The clamping devices are hydraulically operated.

10 Claims, 4 Drawing Figures

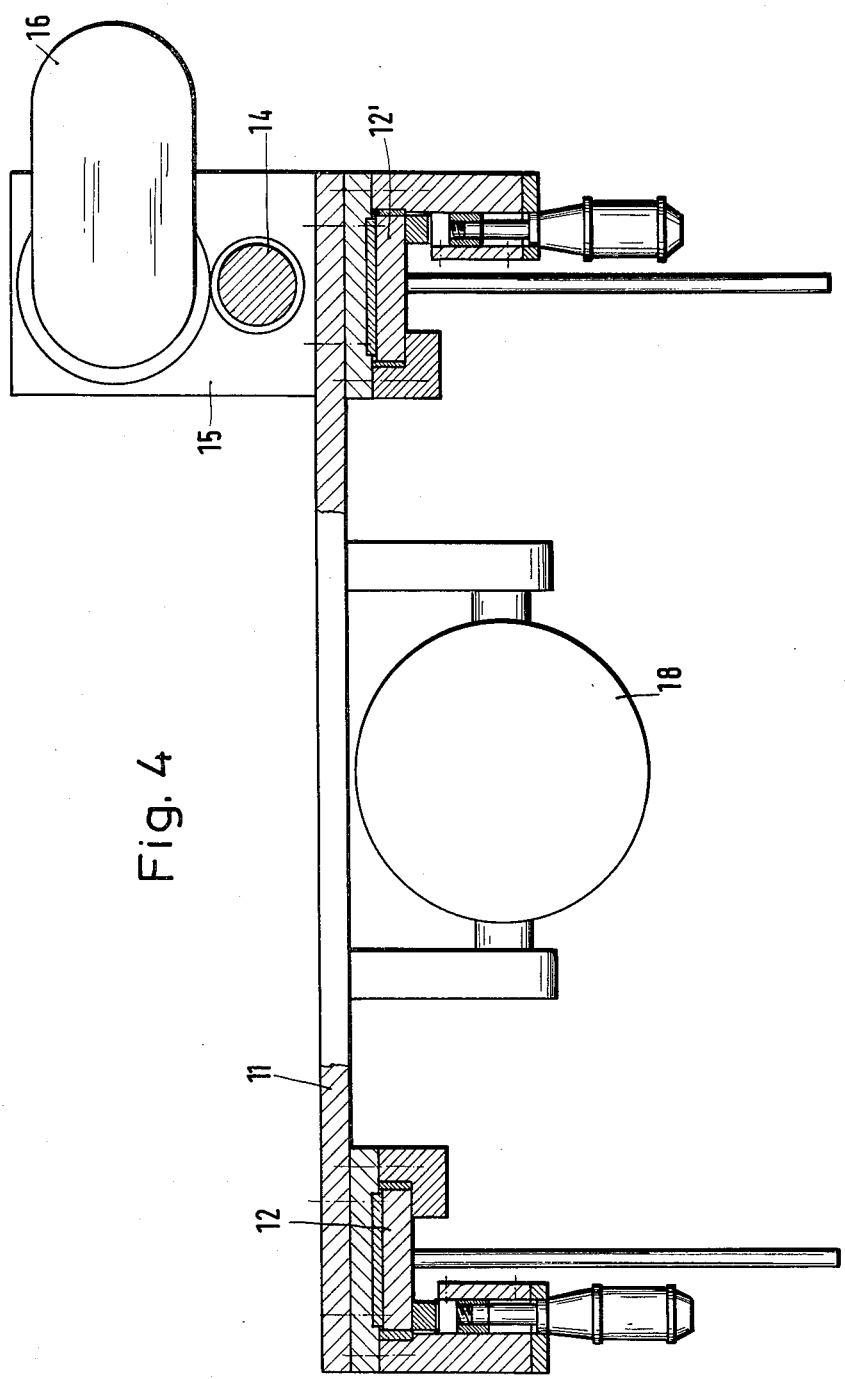

PROCESS AND EQUIPMENT FOR THE PRODUCTION OF SEMI-FINISHED SECTIONS OF ACCURATE WEIGHT OR VOLUME FOR COLD WORKING OR HOT FORMING

This invention relates to a process and equipment for the production of semi-finished sections, in particular billet sections, of accurate weight or volume for cold working or hot forming.

For the production of billet sections of accurate weight or volume it is known to weight billets coming from the rolling mill as a whole, using billet scales, and to determine the length of the individual billet sections, as a function of the length and density of the billets, before the sections are sheared off, using billet shears.

Such a process requires a very large space since the billet scales must be provided as close as possible to the billet shears in order to avoid excessive preparation times before shearing off, but the required space is not always available in that area because the roller conveyor in front of the billet shears cannot be constructed as billet scales. A further obstacle for this process arises since, in some cases, the billet must be pre-heated before shearing off, depending on its material. For this purpose, pre-heating devices are necessary which should be located close to the billet shears and therefore make it more difficult to install billet shears which require a large space.

Furthermore, this known process is inaccurate inasmuch as billets coming from the rolling mill are often curved and have oblique and strongly deformed end faces and different cross sections so that their lengths cannot be measured accurately.

Moreover, the billets have, as a rule, tapered ends and carry adhering scale so that changes in weight result when the billet is sub-divided into billet sections, and these changes also adversely affect the desired accuracy of the charge volume of the sheared off billet sections.

It has thus been found that, with this known process, an accurate charge weight of the billet sections to be forged cannot be achieved to the desired extent, so that the loss of material resulting from the formation of flash on the pieces forged from the billets is relatively large.

For example, when shearing off square billet sections with an edge length of 100 mm, there is, as a rule, a tolerance of about ±2.0 mm. However, with respect to the demands made in closed-top drop forging of a billet section this tolerance is too large because in this case a weight tolerance of only about 0.5% is permissible.

By contrast, it is the object of the invention to provide a process and equipment which make it possible, by automatic control of shearing off or cutting to length, to obtain these accuracies, demanded in practice, of the charge weight or charge volume of the semi-finished sections, in particular, billet sections, and to obtain at the same time an increased shearing off frequency coupled with a reduced space requirement.

According to the invention, this object is achieved in a process for the production of semi-finished sections, in particular, billet sections, for cold working or hot forming of accurate weight or volume in which an elongated workpiece is moved up against a length stop driven by a servo-motor and a semi-finished section is then sheared off the workpiece, wherein data fed into a computer are processed by the latter in order to make it possible automatically to move the length stop in at the position, which corresponds to the accurate weight or volume, for cutting to length the semi-finished sections which are to be formed.

It is advisable here that the computer controls the servo-motor for the length stop as a function of the cross-sectional dimensions, the set weight of the semi-finished sections and the density of the workpiece material on the one hand and of the electronically determined actual weight of the immediately preceding sheared off semi-finished section on the other hand.

A continuing accuracy of the weight is thus achieved by continuously determining whether the tolerance demanded is maintained or exceeded by means of re-introducing the actual weight of the sheared off semi-finished section into the computer.

The accuracy is improved by a design in which the computer takes into account an input correction factor for the cross-sectional dimensions of the workpiece.

If the semi-finished sections have a quadrangular cross section, the edge lengths are fed into the computer as the cross sectional dimensions.

Equipment according to the invention for carrying out the process according to the invention comprises a computer into which the cross-sectional dimensions and the set weight of the semi-finished section and also the density of the workpiece material can be fed, and an electronic weighing cell which in each case determines the weight of the immediately preceding sheared off semi-finished section and which is connected via an analog/digital converter to the input unit of the computer, the output of which is connected to the servo-motor of the length stop.

A further development of the equipment comprises a comparator, of which one input is connected to the output of the computer and another input is connected to the output of an electronic length or distance sensor, which determines the length of the immediately preceding separated semi-finished section, and the output is connected to the servo-motor.

The equipment thus effects a readjustment of the length stop of the shears and hence also of the lengths of the semi-finished sections to be sheared off, on the basis of both the actual weight, determined by the electronic weighing cell of the immediately preceding sheared off semi-finished section, and the actual length thereof, determined by the electronic distance sensor, so that a high accuracy of weight or volume of each successive sheared off semi-finished section is achieved.

This is so because, in general, changes in the quality of the workpiece, from which the semi-finished sections are sheared off, do not appear suddenly but gradually so that the setting of the length stop for shearing off the preceding semi-finished section in each case also applies as a good approximation for the shearing off of the next succeeding semi-finished section, and for this reason only a fine adjustment by the servo-motor is normally necessary and, furthermore, this occurs very rapidly.

In addition, the electric control of the equipment, in particular the electronic weighing cell and the computers, can be designed as a compact unit together with the shears themselves, which unit can be integrated into the transport route of the semi-finished sections or billet sections so that a considerable saving of space is also obtained.

Advantageously, the equipment possesses an indicator, connected to the output of the computer, for the actual tolerance between the set weight and the actual weight of the workpiece. This indication makes it possible to optimize the narrowing of the range of tolerance by altering the input data for the tolerance or for corrections.

It is a particular advantage that the process and the equipment according to the invention can also be used with shears which in themselves are conventional.

In order to ensure the very high accuracy and speed which can be achieved by the automatic electric control of the servo-motor for the length stop, equipment comprising a bridge, carrying the length stop, on two guides which, parallel to the directional movement of the semi-finished section, are connected to shears for semi-finished sections, the bridge being displaceable relative to the guides by means of the servo-motor via a threaded spindle, and clamping devices for clamping the bridge to the guides in the particular shearing off position, is designed in such a way that the computer, by its output unit, is also connected to the clamping devices in order to release the latter, shortly before the bridge is displaced by the servo-motor, or to fix them after repositioning.

In this way, billet shears, in particular those having a shear force of 1,000 Mp and higher for billet weights in the range from 10 to 1,000 kp and a billet feed velocity of approximately 0.5 m/second towards the length stop, can be designed for a high accuracy of weight or volume.

If one guide is a guide bar, it is advisable that the clamping device associated with the guide bar has a pre-tensioned clamping collar which can be actuated by a hydraulic cylinder.

This is because the hydraulic cylinder can be actuated relatively readily by the computer of the electric control installation, for example, via a solenoid valve.

A further development of equipment of this type provides that the piston rod of the hydraulic cylinder passes through one flange of the clamping collar to the other flange, and pull rods, which, on one side of one flange are under a tensile stress by spring elements for the purpose of pre-tensioning, pass through the two flanges on either side of the hydraulic cylinder.

Since only the release of the clamping collar takes place hydraulically, that is to say, by charging the hydraulic cylinder with pressure medium, whilst otherwise the clamping collar is mechanically pre-tensioned, that is to say, by means of the tension bolts and the associated interposed spring elements, in particular, disc springs, the hydraulic system advantageously is subject to the clamping pressure only during the period when the bridge is moved, so that possible leakage losses of the hydraulic system, for example, from its pipes, are very largely avoided.

If the other guide is a flat guide, it is advantageous to provide the flat guide with a clamping device according to German patent application P24 60 615.3-14 corresponding to U.S. Pat. No. 4,033,571 and to connect the two clamping devices to the computer via a common hydraulic control circuit.

This is because the common hydraulic control circuit simplifies the adjustment of the length stop and thus shortens it in time since the control signals are synchronously fed by the computer to the clamping devices.

A particularly extensive constructional simplification is achieved when both guides are flat guides and each of them has its own clamping device according to German patent application P24 60 615.3-14 corresponding to U.S. Pat. No. 4,033,571, which is connected to the computer via a common hydraulic control circuit.

The said advantages of using a common hydraulic control circuit also apply to this design of the equipment.

The invention is illustrated by way of example and diagrammatically in the drawings in which:

FIG. 4 shows the mechanical part of different equipment in sectional view.

Figure 1:
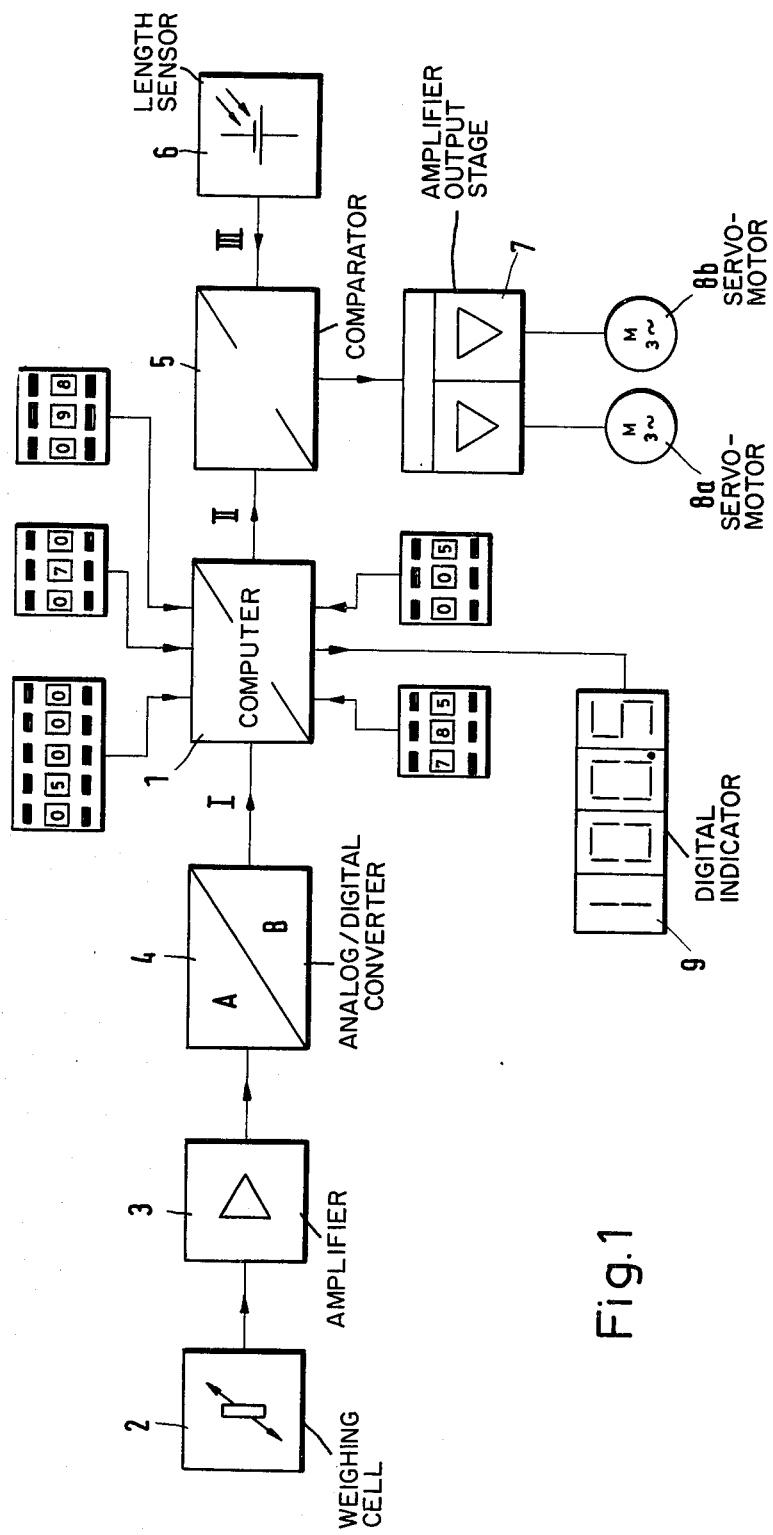
FIG. 1 shows a block circuit diagram of the electronic control of the equipment.

According to FIG. 1, a set weight and an edge length of a quadrangular billet section together with the density of the billet material and a correction factor for the cross-section of the workpiece, which takes into account the rounding off of the four corners of the billet cross section as a function of the corner radii, are fed into a computer 1. From these input data the computer 1 determines the length of the billet section to be separated off. The length stop which is not shown in FIG. 1 is automatically moved into this position.

The input unit of the computer 1 is also connected via an amplifier 3 and an analog/digital converter 4 to an electronic weighing cell 2, which is in itself known, for weighing the particular sheared off billet section.

The output unit of the computer 1 is connected to one input of a comparator 5, of which the other input is fed by an electronic distance or length sensor 6 which is in itself known and which determines the length of the particular sheared off semi-finished sections or billet sections, for example, via the position of the length stop of the billet shears relative to the shearing member.

The output of the comparator 5 is connected to an amplifying output stage 7, the outputs of which are connected to servo-motors 8a and 8b for a rapid traverse or a fine traverse, respectively, for adjusting the length stop.

The control device of FIG. 1 operates as follows:

From the input data of the set weight, the edge length and the density (compare FIG. 1) the computer 1 first calculates, using the volume formula from geometry, the set length of the semi-finished section to be sheared off, corresponding to its weight, since the set length is the only unknown variable in this formula. A fine correction of this set length is then effected by the computer 1 itself by taking into account the actual weight from the weighing cell 2, and the set length thus corrected is compared in the comparator 5 with the actual length determined by the distance sensor 6 so that via the output stage 7 the servo-motors 8a and 8b are actuated only in accordance with the deviation between the set length and the actual length, in order to adjust the length stop. It is essential that the actual tolerance between the set weight and the actual weight can be seen on a luminous digital indicator 9 indicating the tolerance deviation. This indication makes it possible to optimize the narrowing of the range of tolerance by altering the input data for the tolerance or for corrections.

The electric control of the equipment thus effects a readjustment of the length stop of the shears and hence also of the length of the semi-finished sections to be sheared off, on the basis of both the actual weight, determined by the electronic weighing cell 2, of the immediately preceding sheared off semi-finished section and the actual length thereof determined by the electronic distance sensor 6, so that a high accuracy of weight or volume of each successive sheared-off semi-finished section is achieved. Changes in the quality of the workpiece, from which the semi-finished sections are sheared off, do not, however, in general, appear suddenly, but gradually so that the setting of the length stop for shearing off the preceding semi-finished section in each case also applies in good approximation to the shearing off of the next succeeding semi-finished section, and for this reason only a fine adjustment by the servo-motors 8a or 8b is normally necessary and, furthermore, this occurs very rapidly.

Figure 2:
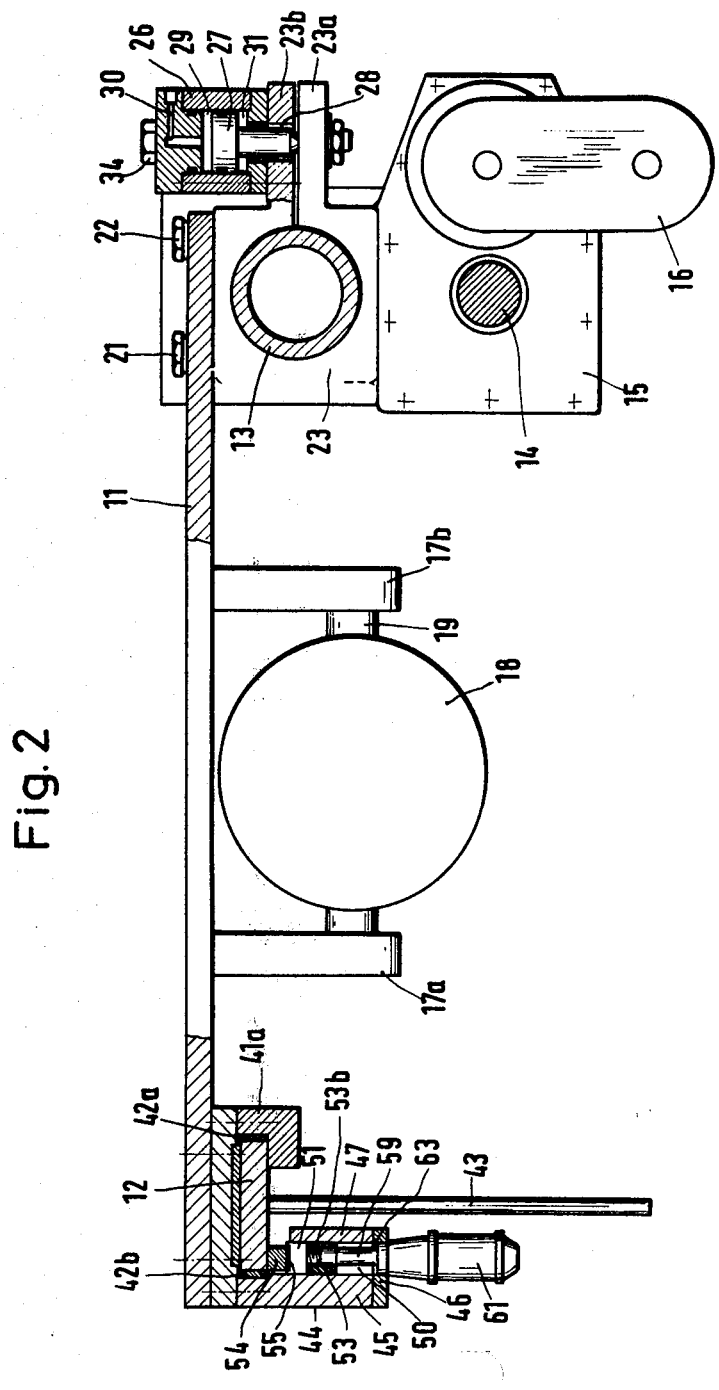
FIGS. 2 and 3 show the mechanical part of the equipment in a sectional view II—II of FIG. 3 and in side view, respectively.
Figure 3:
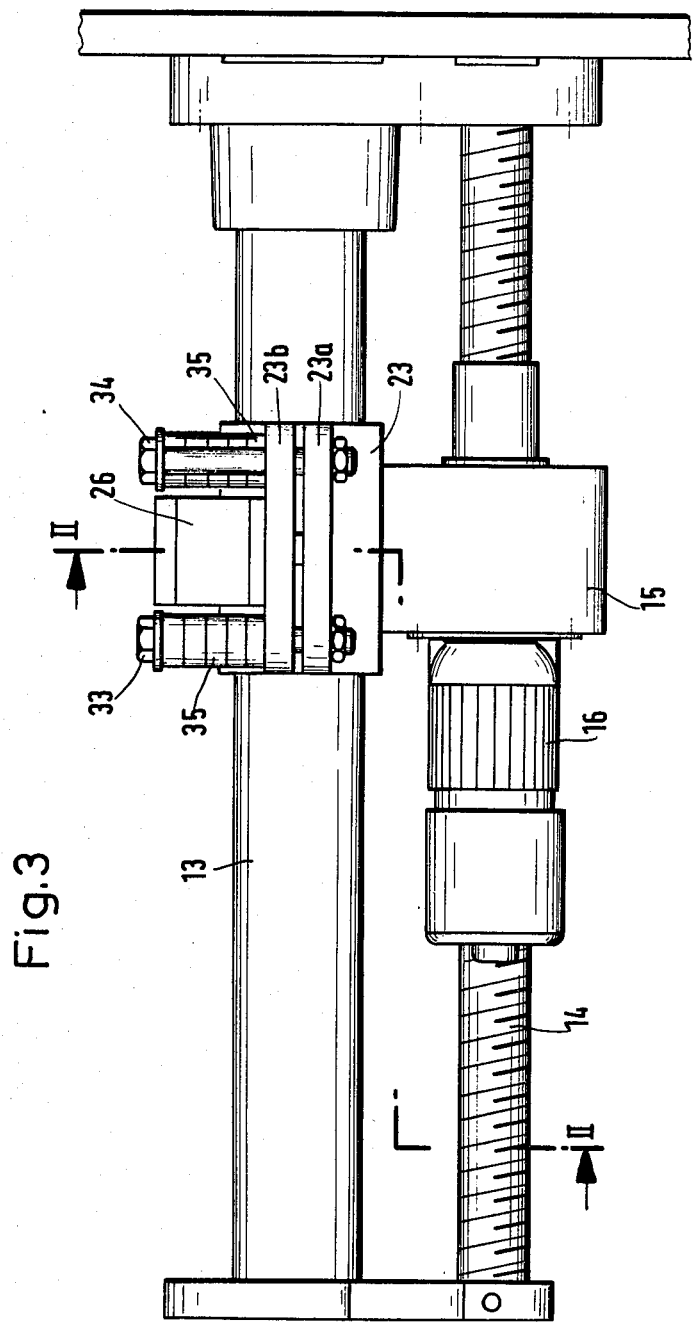

The mechanical part of the equipment, illustrated in FIGS. 2 and 3, should be visualized as being fixed to billet shears on the right-hand side in FIG. 3.

A hydraulically sprung length stop 18 is borne on two strips 17a, 17b on a bridge 11 (compare FIG. 2) which can be moved on two guides perpendicular to the drawing plane of FIG. 2. One of the two guides consists of a flat guide 12 with an associated device for clamping the bridge 11 against a clamping surface of the flat guide 12 according to an earlier proposal (German patent application P24 60 615.3-14), which device is indicated on the left-hand side in FIG. 2 and will be explained in more detail. The other of the two guides comprises a guide bar 13 including a device for clamping, which is designed according to the invention, is illustrated on the right-hand side in FIG. 2, and will also be explained in more detail. A slit bushing 15 with a thread is seated on a threaded spindle 14 (compare FIG. 3) parallel to the guide bar 13, and the threaded spindle 14 can be driven by means of an electric motor 16 having a reduction gear.

The flat guide 12, the guide bar 13 and the threaded spindle 14 are fixed to the machine frame of the billet shears, schematically indicated in FIG. 3.

The clamping device according to the invention which is associated with the guide bar 13 is constructed as follows:

On the right-hand end of the bridge 11 in FIG. 2, a clamping collar 23 which spans the circular guide bar 13 is fixed by means of screws 21 and 22.

The clamping collar 23 has two flanges 23a and 23b. The upper flange 23b is connected via countersunk screws (not shown in more detail in FIG. 2) to a hydraulic cylinder 26 which contains a piston 27, the piston rod of which passes freely through a bore 28 in the upper flange 23b and is opposite the lower flange 23a. The cylinder volume 29 of the hydraulic cylinder 26 is connected via a hydraulic channel 30 to the hydraulic circuit of a transmission gear (not shown because it is in itself known), whilst a cylinder volume 31 on the piston side is connected via a vent bore (not shown) to the open atmosphere.

On either side of the hydraulic cylinder 26, two tension bolts 33 and 34 (only one of these is illustrated in FIG. 2) pass through the flanges 23a and 23b of the clamping collar 23, disk springs 35 which normally hold the two flanges 23a and 23b of the clamping collar 23 under an elastic pre-tension being provided between the upper flange 23b and the heads of the tension bolts 33 and 34. This pre-tension can be balanced by charging the piston 27 in the hydraulic cylinder 26 with pressure medium, by passing pressure medium through the hydraulic channel 30 into the cylinder volume 29 so that the piston 27 which freely passes through the upper flange presses against the lower flange 23a and splays the two flanges 23a and 23b in the sense of releasing the clamping with the guide bar 13. The gap between the bottom of the cylinder volume 31 on the piston side and the piston 27 here is of the same dimension as the desired splaying distance between the two flanges 23a and 23b in order to prevent damage to the clamping collar 23 by an excessive deflection of the lower flange 23a.

Thus, it can be seen that only the release of the clamping collar 23 takes place hydraulically, that is to say by charging the hydraulic cylinder 26 with pressure medium, whilst otherwise the clamping collar 23 is mechanically pre-tensioned, that is to say, by means of the tension bolts 33 and 34 and the associated interposed disc springs 35, so that the hydraulic system advantageously is subject to the clamping pressure only during the period when the bridge 11 is moved, so that possible leakage losses from the hydraulic system, for example, from its pipes, are very largely avoided.

The flat guide 12 with the associated clamping device according to the earlier proposal is constructed as follows, according to the left-hand half of FIG. 2:

The bridge 11 is, as already stated, also supported on the flat guide 12 extending horizontally and lengthwise and is guided on one longitudinal side 42a of the flat guide 12 by means of an angled piece 41a reaching below the latter. The flat guide 12 is borne by one of more supports 43. A bridge-like guide 44 extends downwards at a right angle from the outside of the bridge 11; this guide 44 consists of a vertical plate 45, to the lower end face of which a bridge member 46 is fixed which extends substantially horizontally and parallel to the flat guide 12 and projects in the direction of the support 43. From the longitudinal edge, of the bridge member 46, which projects in the direction of the support 43, a plate 47 extends vertically upwards at a distance from and parallel to the plate 45, which plate 47 is fixed to end walls of the bridge-like guide 44, which end walls are in turn rigidly connected to the plate 45 extending downwards or form a constituent thereof. The bridge-like guide 44 therefore has the shape of housing, its inner cavity 50 receiving a clamping piece 51 and two wedge blocks, of which one wedge block 53 is illustrated and arranged below a toothed strip 54 which extends on the other outer edge 42b of the flat guide 12 on its underside in the longitudinal direction thereof and is provided on its underside with notched toothing 55. The teeth of the notched toothing 55 extend transversely to the longitudinal direction of the toothed strip 54.

The clamping surface of the tension piece 51 which is opposite the toothed strip 54 has notched toothing corresponding to the notched toothing 55, the greatest width of the tension piece 51 having a substantially smaller dimension than the open distance of the end walls of the bridge-like guide 44. The longitudinal sides of the tension piece 51 form wedge surfaces which enclose an acute angle opening in the direction of the flat guide 12, the length of the tension piece 51 having a substantially smaller dimension than the open distance of the bridge member 46 from the toothed strip 54. Coaxially to the longitudinal central axis of the tension piece 51 and at the end thereof which faces away from the flat guide, a recess (not shown) is provided the bottom of which supports the end of a helical compression spring (not shown).

The wedge blocks, such as 53, are guided on the end walls of the bridge-like guide 44 in a direction perpendicular to the flat guide 12 and are provided with wedge surfaces which fit the wedge surfaces of the tension piece 51. The free end of a piston rod, such as 59, is screwed into a threaded bore, such as 53b, of the wedge blocks, such as 53, these two piston rods being displaceable perpendicular to the flat guide 12 by means of compressed air cylinders, such as 61, which can alternately be charged with compressed air. The compressed air cylinders, such as 61, are screwed by their piston-side end into a threaded bore, such as 63, in the bridge member 46.

By a suitable actuation of the compressed air cylinders, such as 61, which act on the wedge blocks, such as 53, which in turn bear against the tension piece 51, the mutually facing surfaces of the flat guide 12 and of the tension piece 51 which, as already mentioned, are provided with notched toothings can be brought into the desired accurate engagement so that the bridge 11 with the length stop 18 can be tightly clamped with infinite variation to the flat guide 12, as is explained in the earlier proposal in yet greater detail.

The compressed air cylinder or cylinders, such as 61, of the flat guide 12 and the pressure transducer which is connected to the hydraulic cylinder 26 on the guide bar 13, are connected to a common pneumatic control circuit (not shown) so that a synchronous tensioning (clamping) or releasing of the two clamping devices for the flat guide 12 and the guide bar 13 is ensured. For this purpose, the pneumatic control circuit is unblocked by the computer 1 (compare FIG. 1) via a solenoid valve (not shown) in the direction of the two clamping devices.

A further embodiment of the mechanical part of the equipment is illustrated in FIG. 4. According to the latter, the bridge 11 rests on two flat guides 12 according to FIG. 2, that is to say, the guide bar 13 on the right-hand side in FIG. 2 is also replaced by a flat guide 12'. Since the flat guides 12 and 12' in FIG. 4 are mutually identical and also identical to the flat guide 12 of FIG. 2, reference may simply be made to the explanation of FIG. 2 including the reference symbols used there.

Moreover, the threaded spindle 14 is in an elevated position in FIG. 4, that is to say, it is located above the flat guide 12', specifically, together with the slit bushing 15 and the electric motor 16.

This embodiment has the particular advantage of greatly simplifying the construction since two identical flat guides are used. In addition, these two flat guides are controlled by the computer 1 via a common hydraulic control circuit (not shown) so that the readjustment of the length stop is also simplified and hence shortened in time since the control signals are synchronously fed to the clamping devices.

It is, of course, intended to cover by the appended claims all such modifications that fall within the true spirit and scope of the invention.

What is claimed is:

1. Equipment for shearing off semi-finished sections, such as billet sections, to close weight tolerances for subsequent cold working and hot forming, from an elongated workpiece by means of shears for semi-finished sections, said equipment comprising:
   a frame;
   a length stop movably mounted on said frame for engaging the end of the workpiece to be severed;
   servo-motor means for adjusting the location of said length stop with respect to the end of the workpiece;
   an hydraulically actuated restraining means for locking said length stop against movement relative to said frame after adjustment and for releasing the length stop prior to the next adjustment, respectively;
   hydraulic control circuit means for actuating said restraining means to alternately lock and release the length stop as required during the work cycle;
   weighing means for determining the weight of the immediately preceding sheared off section;
   computer means for controlling the equipment during the severing process to adjust the location of said length stop with the servo-motor, as a function of the actual weight of the immediately preceding sheared-off semi-finished section, to a first length corresponding to the set weight of the semi-finished section; said computer means including first means for determining said first length by digital computation from parameters including (1) the difference between the fed values for the set weight and the actual weight and (2) the fed values for (a) the cross-sectional dimensions and (b) the density of the material of the workpiece; said computation including a correction factor for the cross-sectional dimensions; and said computer means including second means for operating said hydraulic control circuit means for actuating said restraining means in a given time interval and corresponding to the work cycle.

2. Equipment according to claim 1 including an electronic length sensor which determines the length of the immediately preceding sheared off semi-finished section, the output of which is connected to said servo-motor and including a comparator in which one input is connected to the output of said computer and another input is connected to the output of said length sensor.

3. Equipment according to claim 1 including an indicator connected with the output of the computer for indicating the actual tolerance between the set weight and the actual weight of the workpiece.

4. Equipment according to claim 1 including a weighing cell having an analog output signal, an analog/digital converter for converting the analog output signal into a digital signal, and an amplifier interconnected between said cell and said converter.

5. Equipment according to claims 1 including an amplifying output stage connected immediately in front of said servo-motor.

6. The equipment according to claim 1 in which said restraining means includes clamping devices provided in the shears for semi-finished sections, and further including two guides, a threaded spindle, a bridge mounted along said two guides and connected via said threaded spindle to said servo-motor, in which said length stop is mounted to said bridge, and in which said computer is connected at its output to said hydraulic control circuit for actuating said restraining means to release said restraining means shortly before displacement of the bridge by means of said servo-motor and is adapted to actuate said restraining means for locking the bridge after adjustment.

7. Equipment according to claim 6 in which one guide comprises a guide bar and in which said restraining means include a pre-tensioned clamping collar and a hydraulic cylinder for actuating said collar.

8. Equipment according to claim 7 in which said collar comprises two flanges, in which said hydraulic cylinder has a piston rod passing through one flange of the clamping collar to the other flange, and in which said pre-tensioned collar further includes two pull rods, one on each side of said hydraulic cylinder penetrating both flanges, said collar further including spring means for subjecting at least one side of said one flange to a tensile load for clamping said flanges together under tension.

9. Equipment according to claim 6 in which at least one of said guides is flat and in which restraining means is actuated by the computer through a common hydraulic control circuit.

10. Equipment according to claim 9 in which both said guides are flat guides.

* * * * *